US010645606B2

(12) United States Patent
Fujishiro et al.

(10) Patent No.: US 10,645,606 B2
(45) Date of Patent: May 5, 2020

(54) RADIO COMMUNICATION SYSTEM AND RADIO COMMUNICATION METHOD

(71) Applicant: KYOCERA CORPORATION, Kyoto (JP)

(72) Inventors: Masato Fujishiro, Yokohama (JP); Chiharu Yamazaki, Tokyo (JP); Hiroyuki Urabayashi, Yokohama (JP); Kugo Morita, Higashiomi (JP); Noriyoshi Fukuta, Inagi (JP)

(73) Assignee: KYOCERA Corporation, Kyoto (JP)

(*) Notice: Subject to any disclaimer, the term of this patent is extended or adjusted under 35 U.S.C. 154(b) by 120 days.

(21) Appl. No.: 15/786,122

(22) Filed: Oct. 17, 2017

(65) Prior Publication Data
US 2018/0054753 A1   Feb. 22, 2018

Related U.S. Application Data

(63) Continuation of application No. PCT/JP2016/063253, filed on Apr. 27, 2016.

(30) Foreign Application Priority Data

Apr. 27, 2015 (JP) .............................. 2015-090878

(51) Int. Cl.
  *H04W 28/02* (2009.01)
  *H04W 84/10* (2009.01)
  (Continued)

(52) U.S. Cl.
  CPC ....... *H04W 28/0215* (2013.01); *H04W 16/04* (2013.01); *H04W 16/06* (2013.01);
  (Continued)

(58) Field of Classification Search
  CPC ..... H04W 16/14; H04W 16/06; H04W 28/02; H04W 28/0215; H04W 74/08; H04W 74/0833; H04W 16/04; H04W 84/10
  (Continued)

(56) References Cited

U.S. PATENT DOCUMENTS

2007/0117517 A1* 5/2007 Hui ..................... H04W 72/085
                                                                  455/67.11
2009/0257379 A1* 10/2009 Robinson .............. H04W 16/14
                                                                  370/329

(Continued)

OTHER PUBLICATIONS

International Search Report issued in PCT/JP2016/063253; dated Jul. 12, 2016.

(Continued)

*Primary Examiner* — Rownak Islam
(74) *Attorney, Agent, or Firm* — Studebaker & Brackett PC

(57) ABSTRACT

A radio communication system comprises: a first area entity operated in a first operation scheme in which use of a specific frequency band is permitted; and a second area entity operated in a second operation scheme in which use of the specific frequency band is permitted. A user terminal existing in an area of the first area entity notifies the first area entity of a frequency band change request for requesting a change of a frequency band used by the first area entity when a frequency of the specific frequency band used by the first area entity is congested due to use by the second area entity. The first area entity changes a frequency band used by the first area entity in response to the frequency band change request.

7 Claims, 8 Drawing Sheets

(51) Int. Cl.
   *H04W 16/04* (2009.01)
   *H04W 16/06* (2009.01)
   *H04W 16/14* (2009.01)
   *H04W 74/08* (2009.01)

(52) U.S. Cl.
   CPC ............ *H04W 16/14* (2013.01); *H04W 84/10* (2013.01); *H04W 74/0833* (2013.01)

(58) Field of Classification Search
   USPC ........................................................ 370/230
   See application file for complete search history.

(56) References Cited

U.S. PATENT DOCUMENTS

2012/0213162 A1* 8/2012 Koo ..................... H04W 16/14
   370/329

2013/0308481 A1* 11/2013 Kazmi .................. H04W 48/16
   370/252

OTHER PUBLICATIONS

3rd Generation Partnership Project;Technical Specification Group Radio Access Network; Evolved Universal Terrestrial Radio Access (E-UTRA) and Evolved Universal Terrestrial Radio Access Network (E-UTRAN); overall description; Stage 2; 3GPP TS 36.300 V12.1.0; Mar. 2014; pp. 1-209; Release 12; 3GPP Organizational Partners.
   Hitachi Ltd.; Design targets for LAA using LTE; 3GPP TSG RAN WG1 Meeting #78bis; R1-144221; Oct. 6-10, 2014; pp. 1-5; Ljubljana, Slovenia.
   MediaTek Inc.; LAA reservation signal design; 3GPP TSG RAN WG1 Meeting #80bits; R1-151938; Apr. 20-24, 2015; pp. 1-5; Belgrade, Serbia.

* cited by examiner

RADIO COMMUNICATION SYSTEM AND RADIO COMMUNICATION METHOD

CROSS-REFERENCE TO RELATED APPLICATION

The present application is a continuation based on PCT Application No. PCT/JP2016/063253 filed on Apr. 27, 2016, which claims the benefit of Japanese Patent Application No. 2015-90878 (filed on Apr. 27, 2015). The content of which is incorporated by reference herein in their entirety.

FIELD

The present application relates to a radio communication system and a radio communication method operated in a specific frequency band in which use by a plurality of operation schemes (communication common carriers or communication systems) is permitted.

BACKGROUND

In the 3rd Generation Partnership Project (3GPP) that is a mobile communication system standardization project, in order to cope with the rapid increase in traffic demand, use of a new frequency band has been considered (for example, see Non-Patent Literature 1).

Here, as the new frequency band, use of a specific frequency band can be considered, the specific frequency band including a plurality of component carriers having a predetermined bandwidth, use of a plurality of operation schemes (communication common carriers or communication systems) being permissible in the specific frequency band.

As the specific frequency band, for example, a band used for Wi-Fi, Bluetooth (registered trademark), and the like, that is, an Unlicensed Band requiring no license, can be considered. In 3GPP, a technique for using the unlicensed band with the LTE system (LAA; Licensed Assisted Access) has been studied. Alternatively, the specific frequency band may be the bandwidth of an existing PHS (Personal Handyphone System), or may be the bandwidth of LSA (Licensed Shared Access) shared by a plurality of common carriers.

SUMMARY

A radio communication system according to one disclosure comprises a first area entity operated in a first operation scheme in which use of a specific frequency band is permitted; and a second area entity operated in a second operation scheme in which use of the specific frequency band is permitted. The first area entity notifies a resource occupancy request for requesting occupancy of resources included in the specific frequency band to the second area entity.

A radio communication system according to one disclosure comprises a first area entity operated in a first operation scheme in which use of a specific frequency band is permitted; and a second area entity operated in a second operation scheme in which use of the specific frequency band is permitted. A user terminal existing in an area of the first area entity notifies the first area entity of a frequency band change request for requesting a change of a frequency band used by the first area entity when a frequency of the specific frequency band used by the first area entity is congested due to use by the second area entity. The first area entity changes a frequency band used by the first area entity in response to the frequency band change request.

A radio communication system according to one disclosure comprises a first area entity operated in a first operation scheme in which use of a specific frequency band is permitted; and a second area entity operated in a second operation scheme in which use of the specific frequency band is permitted. The second area entity or a second user terminal existing in an area of the second area entity notifies the first area entity that a reservation of resources for performing communication between the second area entity and the second user terminal is necessary.

A radio communication system according to one disclosure comprises a first area entity operated in a first operation scheme in which use of a specific frequency band is permitted; and a second area entity operated in a second operation scheme in which use of the specific frequency band is permitted. The specific frequency band includes connection procedure resources in which allocation to data transmission is prohibited. A user terminal existing in an area of the first area entity performs a connection procedure for the first area entity by using the connection procedure resources.

A radio communication method according to one disclosure is used in a radio communication system including a first area entity operated in a first operation scheme in which use of a specific frequency band is permitted; and a second area entity operated in a second operation scheme in which use of the specific frequency band is permitted. The radio communication method comprises the step of notifying a resource occupancy request for requesting occupancy of resources included in the specific frequency band from the first area entity to the second area entity.

A radio communication method according to one disclosure is used in a radio communication system including a first area entity operated in a first operation scheme in which use of a specific frequency band is permitted; and a second area entity operated in a second operation scheme in which use of the specific frequency band is permitted. The radio communication method comprising the steps of: notifying, from a user terminal existing in an area of the first area entity to the first area entity, a frequency band change request for requesting a change of a frequency band used by the first area entity when a frequency of the specific frequency band used by the first area entity is congested due to use by the second area entity; and changing a frequency band used by the first area entity in response to the frequency band change request by the first area entity.

A radio communication method according to one disclosure is used in a radio communication system including a first area entity operated in a first operation scheme in which use of a specific frequency band is permitted; and a second area entity operated in a second operation scheme in which use of the specific frequency band is permitted. The radio communication method comprising the step of notifying, from the second area entity or a second user terminal existing in an area of the second area entity to the first area entity, that a reservation of resources for performing communication between the second area entity and the second user terminal is necessary.

A radio communication method according to one disclosure is used in a radio communication system including a first area entity operated in a first operation scheme in which use of a specific frequency band is permitted, the specific frequency band including connection procedure resources in which allocation to data transmission is prohibited; and a second area entity operated in a second operation scheme in which use of the specific frequency band is permitted. The radio communication method comprising the step of performing a connection procedure for the first area entity by using the connection procedure resources by a user terminal existing in an area of the first area entity.

DESCRIPTION OF EMBODIMENTS

Figure 1:
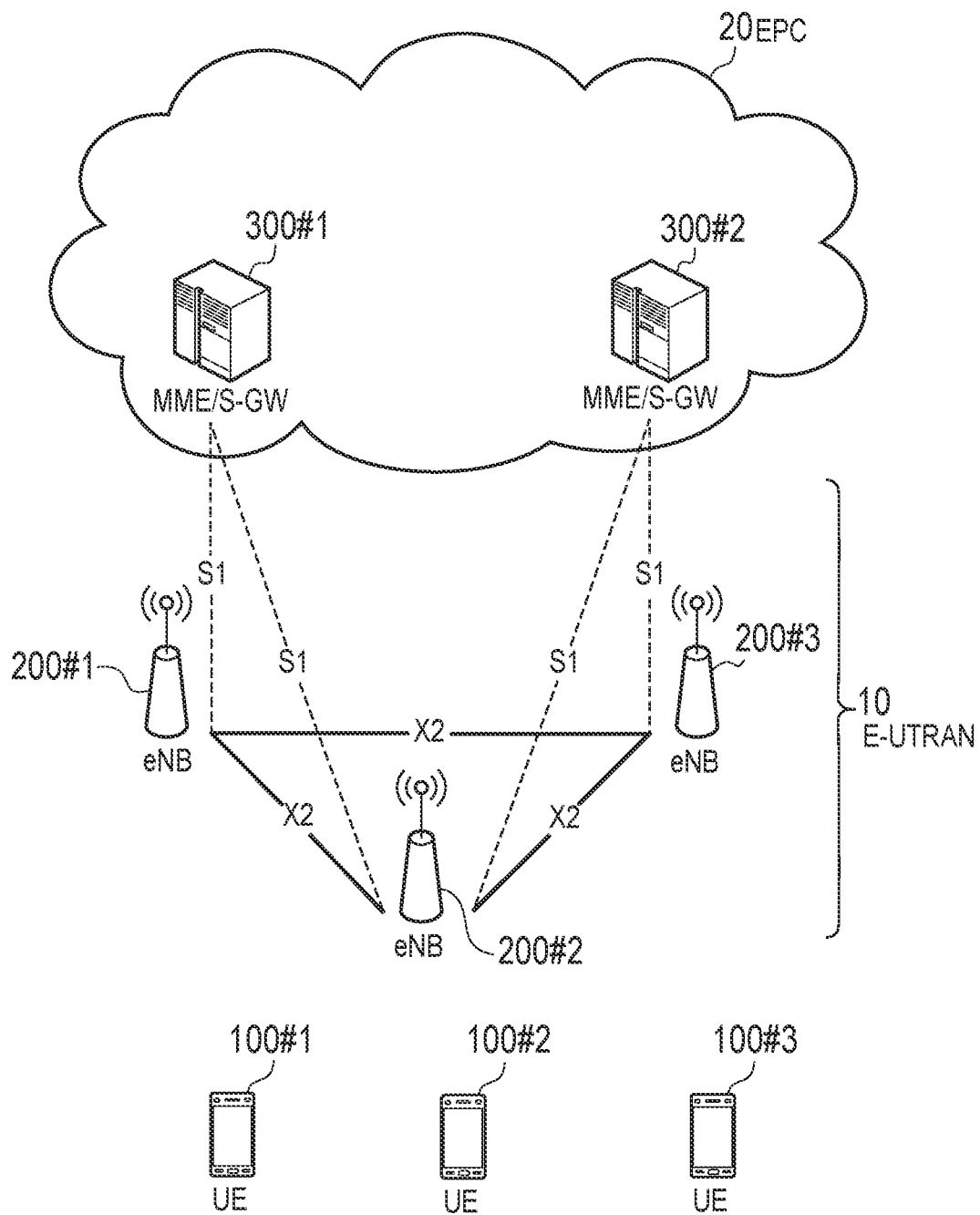
FIG. 1 is a configuration diagram of an LTE system according to an embodiment.

Embodiments is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

SUMMARY OF DISCLOSURE

Since the specific frequency band is a frequency band in which use by different operation schemes (communication common carriers or communication systems) is permitted, interference control is required between different operation schemes, but coordination between different operation schemes has not been studied.

Thus, the embodiment has been made to solve the above problem, and provides a radio communication system and a radio communication method enabling performing interference control in the specific frequency band with coordination between different operation schemes.

The radio communication system according to the summary of disclosure includes: a first area entity operated in a first operation scheme in which use of a specific frequency band is permitted, and a second area entity operated in a second operation scheme in which use of the specific frequency band is permitted; and the first area entity notifies a resource occupancy request for requesting occupancy of resources included in the specific frequency band to the second area entity.

In the radio communication system according to the summary of disclosure, the first area entity notifies the second area entity of a resource occupancy request for requesting the occupancy of the resources included in the specific frequency band. Therefore, interference control in the specific frequency band can be performed by the coordination between different operation schemes. That is, the communication provided by the first operation scheme can be performed while interference in the first operation scheme from the second operation scheme is prevented.

The radio communication system according to the summary of disclosure includes: a first area entity operated in a first operation scheme in which use of a specific frequency band is permitted, and a second area entity operated in a second operation scheme in which use of the specific frequency band is permitted; and a user terminal existing in an area of the first area entity notifies the first area entity of a frequency band change request for requesting a change of a frequency band used by the first area entity when a frequency of the specific frequency band used by the first area entity is congested due to use by the second area entity, and the first area entity changes a frequency band used by the first area entity in response to the frequency band change request.

In the radio communication system according to the summary of disclosure, the first area entity changes the frequency band used by the first area entity in response to the frequency band change request. Therefore, interference control in the specific frequency band can be performed by the coordination between different operation schemes. That is, the communication provided by the first operation scheme can be performed while interference in the first operation scheme from the second operation scheme is prevented.

The radio communication system according to the summary of disclosure includes: a first area entity operated in a first operation scheme in which use of a specific frequency band is permitted, and a second area entity operated in a second operation scheme in which use of the specific frequency band is permitted; and the second area entity or a second user terminal existing in an area of the second area entity notifies the first area entity that a reservation of resources for performing communication between the second area entity and the second user terminal is necessary.

In the radio communication system according to the summary of disclosure, the second area entity or the second user terminal notifies the first area entity that the reservation of resources for performing communication between the second area entity and the second user terminal is necessary. Therefore, interference control in the specific frequency band can be performed by the coordination between different operation schemes. That is, the communication provided by the second operation scheme can be performed while interference in the second operation scheme from the first operation scheme is prevented.

The radio communication system according to the summary of disclosure includes: a first area entity operated in a first operation scheme in which use of a specific frequency band is permitted, and a second area entity operated in a second operation scheme in which use of the specific frequency band is permitted; and the specific frequency band includes connection procedure resources in which allocation to data transmission is prohibited, and a user terminal existing in an area of the first area entity performs a connection procedure for the first area entity by using the connection procedure resources.

In the radio communication system according to the summary of disclosure, a user terminal existing in an area of the first area entity performs a connection procedure for the first area entity by using the connection procedure resources in which allocation to data transmission is prohibited. Interference control in the specific frequency band can be performed by the coordination between different operation schemes. That is, the communication provided by the first operation scheme can be started while interference in the first operation scheme from the second operation scheme is prevented.

Here, the "operation scheme" means a scheme for operating a communication service, and for example, a communication common carrier or a communication system operated in a different scheme. It should be noted that coordination between different operation schemes has not been studied in the radio communication system according to the background art.

The "area entity" means an entity having a function of communicating with a user terminal existing in a radio communication area. For example, the area entity can be read as a radio base station or a cell of a mobile communication network (3GPP). The area entity can be read as a Wi-Fi access point.

The "existence in area" means that the user terminal exists in a radio communication area managed by an area entity. For example, in the mobile communication network (3GPP), the "existence in area" means a state where the location registration of the user terminal is completed (RRC idle state or RRC connected state). In Wi-Fi, the "existence in area" means that the user terminal exists within the coverage area of the access point.

The "connection" means that the area entity and the user terminal are in a communicable state. For example, in the mobile communication network (3GPP), the "connection" means a state in which an RRC connection is established between the user terminal and the radio base station (RRC connected state). In Wi-Fi, the "connection" means a state in which the authentication of the user terminal is completed by the access point.

[Embodiments]

An embodiment will be described by using, as an example, an LTE system based on 3GPP standards as a radio communication system, below.

(System Configuration)

The system configuration of LTE system according to a first embodiment will be described. FIG. 1 is a configuration diagram of the LTE system according to the embodiment.

As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell in a case where the UE 100 is in an RRC connected state) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a radio base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resources management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
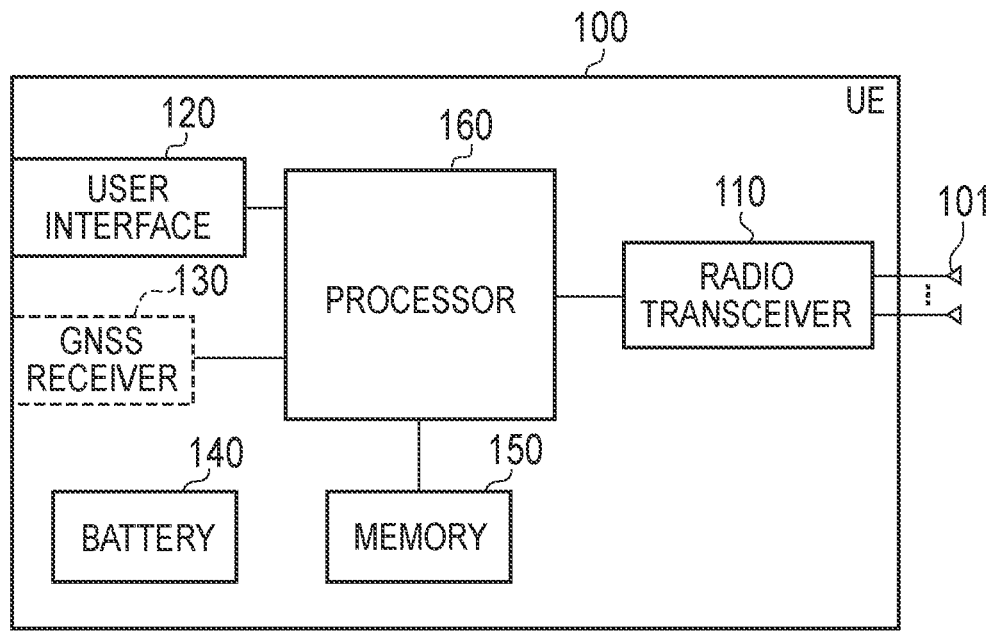
FIG. 2 is a block diagram of the UE 100 according to the embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The radio transceiver 110 and the processor 160 constitute a transmitter and a receiver. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
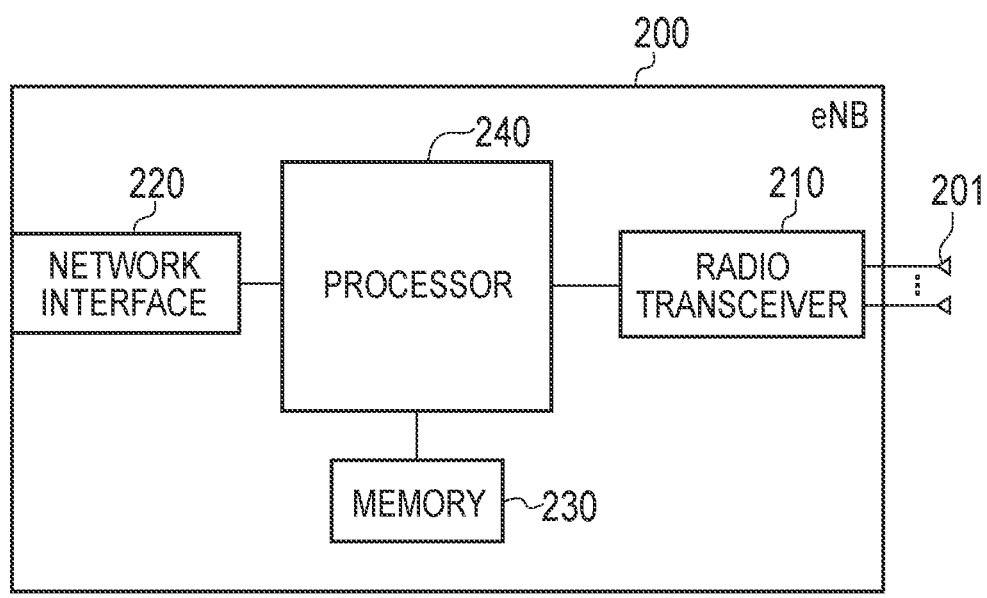
FIG. 3 is a block diagram of the eNB 200 according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller. The radio transceiver 210 and the processor 240 constitute a transmitter and a receiver. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface, and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
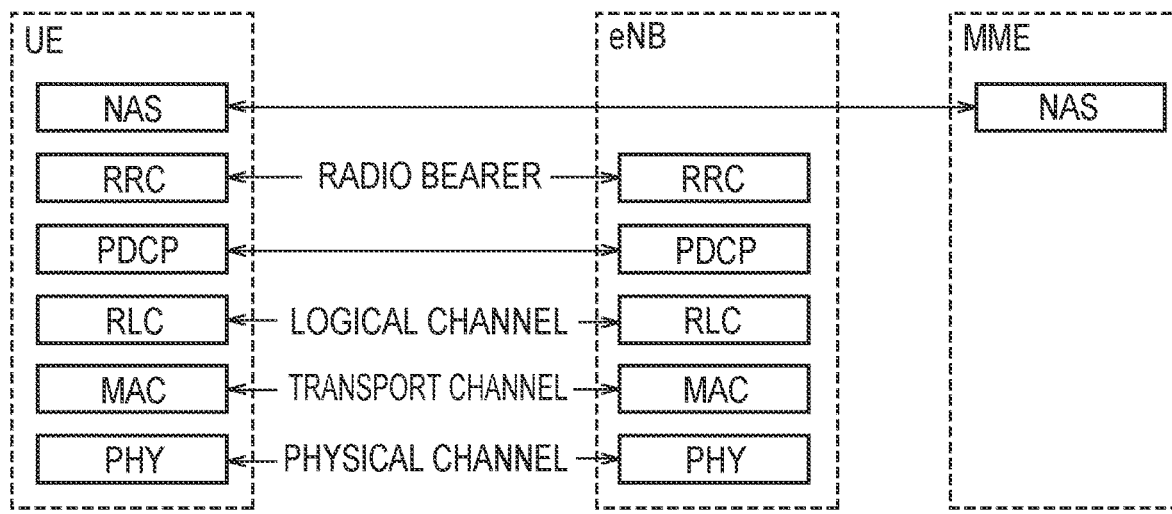
FIG. 4 is a protocol stack diagram of a radio interface according to the embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption. It should also be noted that in the PDCP layer, a transmitting entity for transmitting data unit (PDCP PDU) or a receiving entity for receiving data unit (PDCP PDU) is formed.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. When there is no connection (an RRC connection) between the RRC of the UE 100 and the RRC of the eNB 200, the UE 100 is in an RRC idle state.

An NAS (Non-Access Stratum) layer positioned above the RRC layer performs session management, mobility management and the like.

Figure 5:
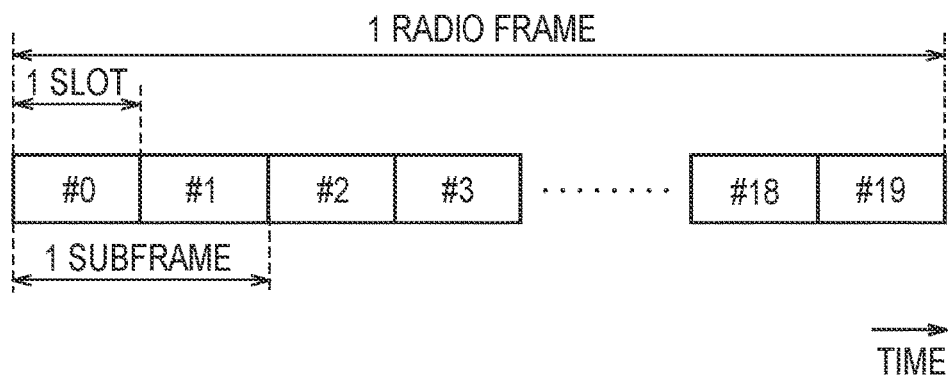
FIG. 5 is a configuration diagram of a radio frame used in the LTE system according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(Application Scene)

Figure 6:
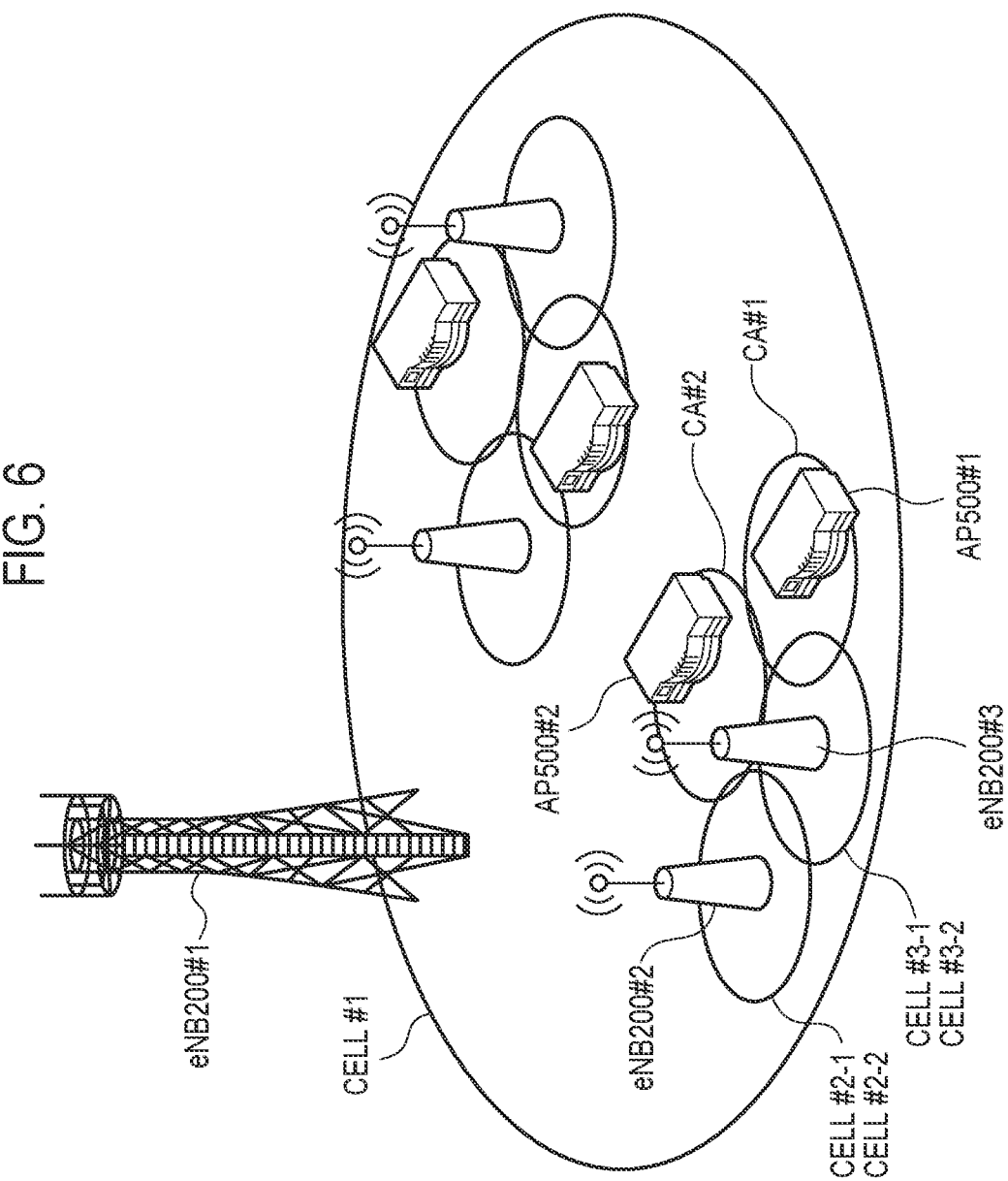
FIG. 6 is a diagram for explaining an application scene according to the embodiment.

In the following, an application scene will be described. FIG. 6 is a diagram for explaining an application scene according to the embodiment.

As shown in FIG. 6, the radio communication system includes a plurality of eNBs (for example, eNB 200#1, eNB 200#2, and eNB 200#3) and a plurality of APs (AP 500#1 and AP 500#2).

The eNB 200#1 is an eNB 200 installed, for example, by a communication common carrier. The eNB 200#1 has a cell #1 as a radio communication area. In the cell #1, a licensed band in which a license is required (Licensed Band) is used. The licensed band is an example of a band allocated to a communication common carrier (hereinafter referred to as a common carrier band).

The eNB 200#2 and the eNB 200#3 are eNBs 200 established by a communication common carrier. However, the eNB 200#2 may be installed by a third party different from a communication common carrier. The eNB 200#2 has a cell #2-1 and a cell #2-2 as radio communication areas, and the eNB 200#3 has a cell #3-1 and a cell #3-2 as radio communication areas. In the cell #2-1 and the cell #3-1, common carrier bands are used in the same manner as in the cell #1. On the other hand, in the cell #2-2 and the cell #3-2, unlicensed bands in which licenses are not required (Unlicensed Band) are used. The unlicensed band is an example of a specific frequency band in which use by a plurality of communication common carriers or a plurality of communication systems is permitted.

The AP 500#1 and the AP 500#2 are access points used in Wi-Fi (registered trademark), Bluetooth (registered trademark), and the like. The AP 500#1 has a coverage area CA #1 as a radio communication area, and the AP 500#2 has a coverage area CA #2 as a radio communication area. In the coverage area CA #1 and the coverage area CA #2, unlicensed bands are used in the same manner as in the cell #2-2 and the cell #3-2.

In the embodiment, the radio communication system includes a first area entity operated in a first operation scheme in which use of a specific frequency band is permissible, and a second area entity operated in a second operation scheme in which use of a specific frequency band is permissible.

Here, the "operation scheme" means a scheme for operating a communication service, and for example, a communication common carrier or a communication system operated in a different scheme. It should be noted that coordination between different operation schemes has not been studied in the radio communication system according to the background art.

In addition, the "area entity" means an entity having a function of communicating with a user terminal existing in a radio communication area. For example, the area entity can be read as a radio base station or a cell of a mobile communication network (3GPP). The area entity can be read as a Wi-Fi access point and can also be read as a master device of Bluetooth (registered trademark).

In this case, the first area entity notifies the second area entity of a resource occupation request for requesting occupation of resources included in the specific frequency band. On the other hand, the second area entity notifies the first area entity of a resource occupancy response as a response to the resource occupancy request.

Here, preferably, the first area entity notifies the second area entity of the resource occupancy request through a user terminal connected at least to the first area entity. Preferably, the second area entity notifies the first area entity of the resource occupancy response through the user terminal. That is, when there is no interface directly connecting the first area entity and the second area entity to each other, preferably, a resource occupancy request and a resource occupancy response are exchanged between the first area entity and the second area entity with a user terminal connected at least to the first area entity as an intermediary.

In the embodiment, preferably, the resource occupancy request includes one or more pieces of information selected from within information indicating the frequency band that the first area entity desires to occupy (hereinafter, referred to as occupancy bandwidth information (Bandwidth)), information indicating the center frequency of the frequency band that the first area entity desires to occupy (hereinafter, referred to as center frequency information (EARFCN)), information indicating the occupancy time that the first area entity desires to occupy (hereinafter, referred to as occupancy time information (Expected occupancy time)), information indicating the transmission power that the second area entity is permitted to use (hereinafter, referred to as permissible transmission power information (Acceptable Tx power of Neighbor)), information identifying the first area entity (hereinafter, referred to as cell identification information (Cell ID)), and information identifying the resource occupancy request (hereinafter, referred to as occupancy identification information (Occupancy ID)).

The occupancy bandwidth information is, for example, information indicating the minimum resource block and the maximum resource block of the bandwidth that the first area entity desires to occupy. When information on the resource block is shared between the first area entity and the second area entity, the occupancy bandwidth information is used so that the second area entity identifies the bandwidth that the first area entity desires to occupy. The bandwidth that the first area entity desires to occupy may be information such as "aaa" MHz to "bbb" MHz, may be information for identifying a resource block that the first area entity desires to occupy, or may be information indicating the minimum resource block and the maximum resource block.

The center frequency information is, for example, information such as "ccc" MHz. The center frequency information is used so that the second area entity estimates the bandwidth that the first area entity desires to occupy (the channel being the unit of the frequency band used for communication).

The occupancy time information is, for example, information such as "ddd" minutes. The occupancy time information is used so that the second area entity identifies the period during which use of the frequency band should be prevented.

The permissible transmission power information may be, for example, information indicating the upper limit value of transmission power (dBm) or information indicating a difference by which the current transmission power should be decreased ($\Delta dB$). The permissible transmission power information is used so that the second area entity identifies the degree to which the transmission power should be reduced.

The cell identification information may be information for identifying a radio base station, a cell, an access point, or the like. The occupancy identification information may be information to be optionally allocated. The cell identification information and the occupancy identification information are used for notification of resource occupancy response and the like.

The resource occupancy request may include one or more pieces of information selected from within information for identifying the first area entity and the neighbor area entity neighboring the first area entity (hereinafter, referred to as recognition cell information (Recognized Cell ID (or Recognized Occupancy ID)), information indicating the timing difference between the first area entity and the neighbor area entity (hereinafter, referred to as timing difference information (Timing offset)), information indicating the pattern of resources that the first area entity is planned to occupy (hereinafter, referred to as occupancy pattern information (Planned time (and/or frequency) resource)), information indicating whether or not the first area entity becomes the master area entity that leads the resource coordination between different operation schemes (hereinafter, referred to as master flag), information indicating the time elapsed since the first area entity becomes the master area entity (hereinafter, referred to as master time), information for identifying the subordinate area entity in which resource is coordinated by the first area entity (hereinafter, referred to as control cell information (Cell in controlled)), and information for avoiding collision of the master area entity (hereinafter, referred to as collision avoidance information (Contention resolution)).

The recognition cell information may be information indicating the area entity recognized by the first area entity (for example, a cell), or may be information indicating an area entity recognized by a user terminal connected at least to the first area entity (for example, a cell).

The timing difference information is information indicating the difference in timing used in the area entities included in the recognition cell information (for example, difference in frame start timing).

The occupancy pattern information is one or more pieces of information selected from within the information indicating the bandwidth that the first area entity is planned to occupy (for example, resource block) and the time (for example, subframe).

The master flag is used in the case where any one of the area entities provided in the radio communication system leads the coordination control. The master flag may be a flag indicating that the own entity is the master area entity, or may be a flag indicating that the own entity runs for the master area entity.

The master time is used in the case where any one of the area entities provided in the radio communication system leads the coordination control. The master time indicates the effective period during which the own entity can operate as a master area entity.

The control cell information is used in the case where any one of the area entities provided in the radio communication system leads the coordination control. The control cell information is information indicating the neighbor area entity that the own area entity can control.

The collision avoidance information is used in the case where any one of the area entities provided in the radio communication system leads the coordination control. The collision avoidance information is, for example, information indicating the priority determined in advance for each area entity. In this case, the area entity with the highest priority becomes the master area entity. Alternatively, the collision avoidance information may be information indicating a method for determining the master area entity.

These pieces of information allow the opportunities of using resources included in the specific frequency band to be appropriately distributed even when resources that each area entity desires to occupy collide.

The resource occupancy response includes one or more pieces of information selected from within information indicating whether or not to accept the resource occupancy request (hereinafter, referred to as Ack information), information indicating the frequency band the occupancy of which by the first area entity is permitted (hereinafter, referred to as counterproposal information (Counter proposal)), information indicating the frequency band that the second area entity uses (hereinafter, referred to as used frequency band information (Current own occupancy info.)), information for identifying the first area entity and the second area entity (cell identification information (Cell ID) described above), and information for identifying the resource occupancy request (occupancy identification information (Occupancy ID) described above).

The Ack information is information such as OK or NG The counterproposal information may be, for example, information indicating the lower limit and the upper limit of the frequency band the occupancy of which by the first area entity is permitted, or may be information indicating the center frequency of the frequency band the occupancy of which by the first area entity is permitted. The used frequency band information may be information indicating the lower limit and the upper limit of the frequency band used by the second area entity, or may be information indicating the center frequency of the frequency band used by the second area entity.

The resource occupancy response may include one or more pieces of information selected from within information for identifying the second area entity and the neighbor area entity neighboring the second area entity (recognition cell information (Recognized Cell ID (or Recognized Occupancy ID) described above), information indicating the timing difference between the second area entity and the neighbor area entity (timing difference information (Timing offset) described above), information indicating the pattern of resources that the second area entity is planned to occupy (occupancy pattern information (Planned time (and/or frequency) resource) described above), information indicating whether or not the second area entity becomes the master area entity that leads the resource coordination between different operation schemes (master flag described above), information indicating the time elapsed since the second area entity becomes the master area entity (master time described above), information for identifying the slave area entity in which resource is coordinated by the second area entity (control cell information (Cell in controlled) described above), and information for avoiding collision of the master area entity (collision avoidance information (Contention resolution) described above). It should be noted that the information indicating whether or not the second area entity becomes the master area entity that leads the resource coordination between different operation schemes may be the answer in the affirmative or negative to the information indicating whether or not the first area entity becomes the master area entity that leads the resource coordination between different operation schemes in the resource occupancy request from the first area entity.

(Radio Communication Method)

Figure 7:
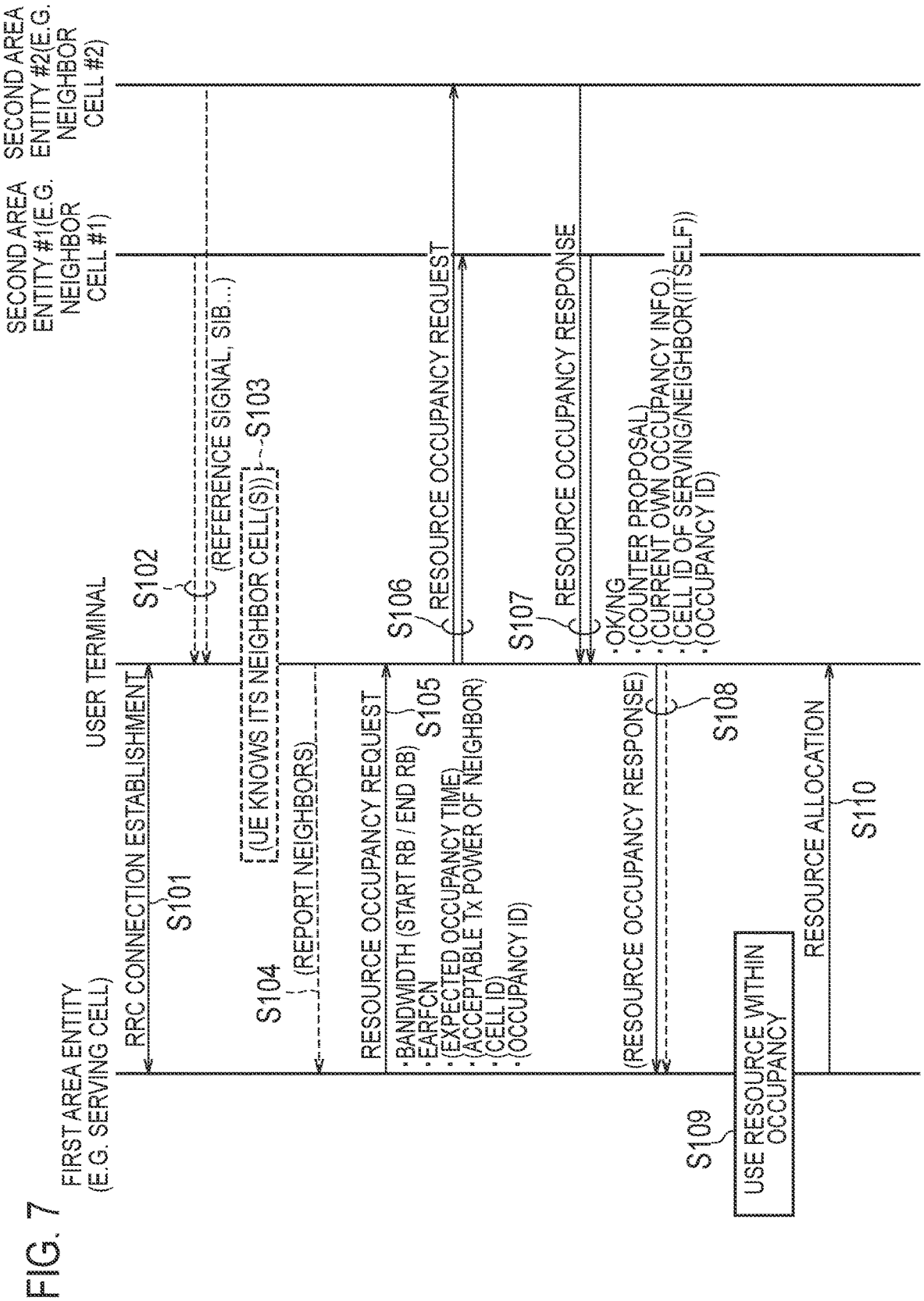
FIG. 7 is a sequence diagram showing a radio communication method according to the embodiment.
Figure 8:
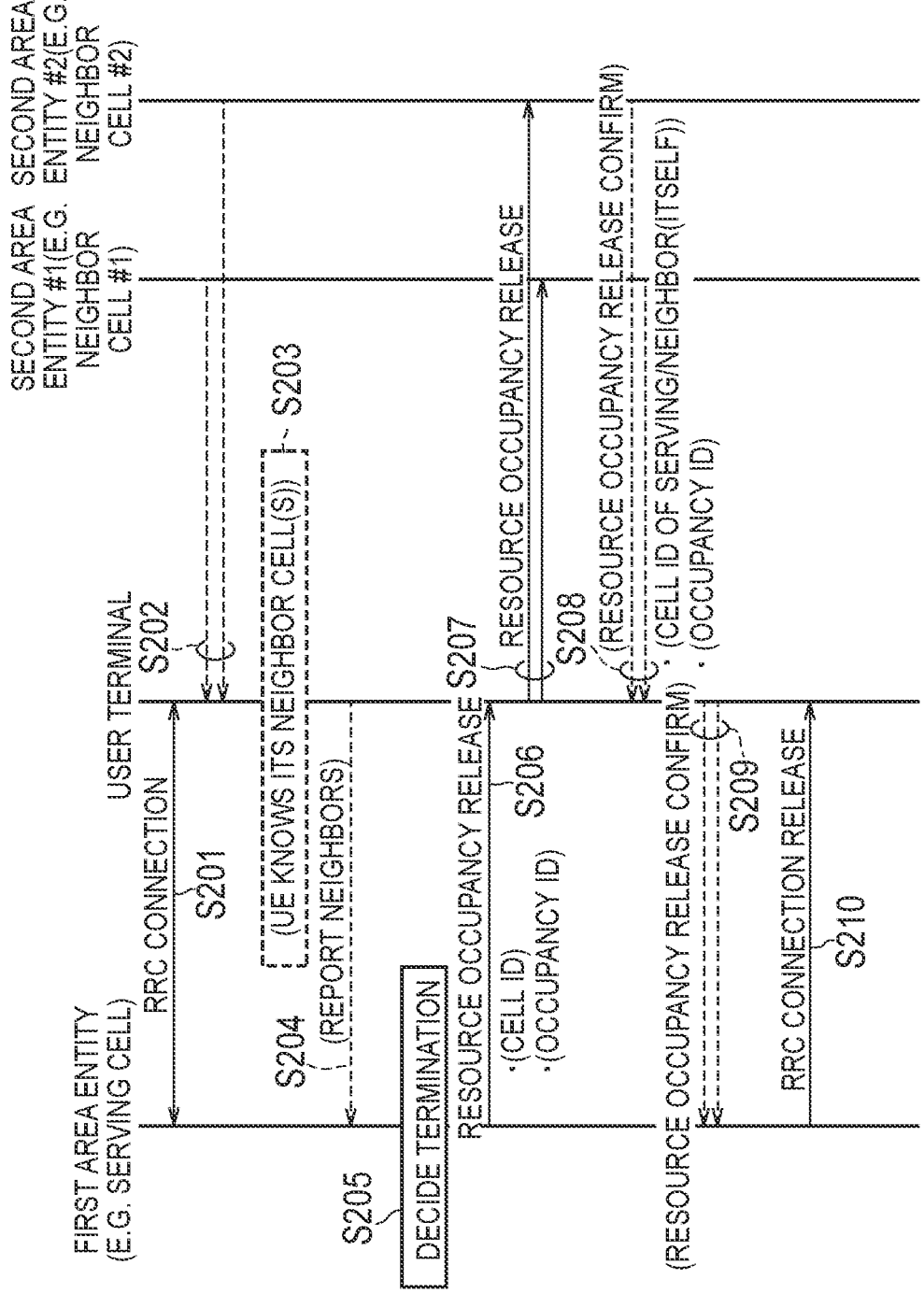
FIG. 8 is a sequence diagram showing a radio communication method according to the embodiment.

In the following, a radio communication method according to the embodiment will be described. FIG. 7 and FIG. 8 are sequence diagrams showing a radio communication method according to the embodiment. Here, as the first area entity, the serving cell to which the user terminal is connected is illustrated, and as the second area entities, the neighbor cells neighboring the serving cell (neighbor cells #1 and #2) are illustrated. However, the embodiment is not limited to this, and the first area entity only has to be an area entity that manages at least the communication area to which the user terminal is connected. Similarly, the second area entity only has to be a neighbor area entity neighboring the first area entity (a radio base station cell or an access point).

First, a case of starting the occupancy of resources will be described with reference to FIG. 7. As shown in FIG. 7, in step S101, the user terminal establishes an RRC connection with the first area entity.

In step S102, the user terminal receives notification signals (for example, a reference signal or SIB) notified from the second area entities (here, the second area entities #1 and #2).

In step S103, the user terminal recognizes the second area entities (here, the second area entities #1 and #2) neighboring the first area entity.

In step S104, the user terminal reports the second area entities (here, the second area entities #1 and #2) recognized in step S103 to the first area entity.

In step S105, the first area entity transmits a resource occupancy request for requesting the occupancy of the resources included in the specific frequency band to the user terminal. In step S106, the user terminal transmits resource occupancy requests to the second area entities (here, the second area entities #1 and #2). That is, in steps S105 and S106, the first area entity notifies the second area entity of the resource occupancy request through the user terminal connected to the first area entity.

In step S107, the second area entities (here, the second area entities #1 and #2) transmit resource occupancy responses to the user terminal as a response to the resource occupancy request. In step S108, the user terminal transmits a resource occupancy response to the first area entity. That is, in steps S107 and S108, the second area entity notifies the first area entity of the resource occupancy response through the user terminal connected to the first area entity.

In step S109, the first area entity determines the resources to be allocated to the user terminal in response to the resource occupancy response. For example, when receiving a resource occupancy response including information to accept the resource occupancy request (OK) as a response to the resource occupancy request including occupancy bandwidth information, the first area entity determines the resources allocated to the user terminal from within the bandwidth indicated by the occupancy bandwidth information. Alternatively, when receiving a resource occupancy response including the counterproposal information, the first area entity determines the resources to be allocated to the user terminal from within the bandwidth indicated by the counterproposal information.

In step S110, the first area entity transmits a message for allocating the resources determined in step S109 to the user terminal.

Second, a case of ending the occupancy of resources will be described with reference to FIG. 8. As shown in FIG. 8, in step S201, an RRC connection is established between the user terminal and the first area entity.

In step S202, the user terminal receives notification signals (for example, MIB or SIB) notified from the second area entities (here, the second area entities #1 and #2).

In step S203, the user terminal recognizes the second area entities (here, the second area entities #1 and #2) neighboring the first area entity.

In step S204, the user terminal reports the second area entities (here, the second area entities #1 and #2) recognized in step S203 to the first area entity.

In step S205, the first area entity decides whether or not to end the occupancy of the resources allocated to the user terminal in step S110 shown in FIG. 7. Here, the description will be continued assuming that the occupancy of the resources is decided to be ended.

In step S206, the first area entity transmits resource occupancy release for releasing the occupancy of the resources included in the specific frequency band to the user terminal. In step S207, the user terminal transmits resource occupancy release to the second area entities (here, the second area entities #1 and #2). That is, in steps S206 and S207, the first area entity notifies the second area entity of the resource occupancy release through the user terminal connected to the first area entity.

In step S208, the second area entities (here, the second area entities #1 and #2) transmit resource occupancy release confirmation to the user terminal as a response to the resource occupancy release. In step S209, the user terminal transmits resource occupancy release confirmation to the first area entity. That is, in steps S208 and S209, the second area entity notifies the first area entity of the resource occupancy release confirmation through the user terminal connected to the first area entity.

In step S210, the first area entity transmits a message for releasing the resources allocated to the user terminal in step S110 shown in FIG. 7 to the user terminal.

In FIGS. 7 and 8, the resource occupancy request, the resource occupancy response, the resource occupancy release, and the resource occupancy release confirmation are exchanged between the first area entity and the second area entity through the user terminal connected to the first area entity. However, the embodiment is not limited to this. When there is an interface directly connecting the first area entity and the second area entity, the resource occupancy request, the resource occupancy response, the resource occupancy release, and the resource occupancy release confirmation may be exchanged without going through the user terminal connected to the first area entity. Alternatively, when there is an interface connecting the first area entity and the second area entity through an upper node connected to the first area entity and the second area entity, the resource occupancy request, the resource occupancy response, the resource occupancy release, and the resource occupancy release confirmation may be exchanged through the upper node.

(Action and Effect)

In the radio communication system according to the embodiment, the first area entity notifies the second area entity of a resource occupancy request for requesting the occupancy of the resources included in the specific frequency band. Therefore, interference control in the specific frequency band can be performed by the coordination between different operation schemes. That is, the communication provided by the first operation scheme can be performed while interference in the first operation scheme from the second operation scheme is prevented.

[First Modification]

In the following, a first modification of the embodiment will be described. In the following, differences from the embodiment will be mainly described.

In the embodiment, the first area entity notifies the second area entity of a resource occupancy request for requesting the occupancy of the resources included in the specific frequency band. On the other hand, in the first modification, the user terminal existing in the area of the first area entity notifies the first area entity of a frequency band change request for requesting a change of the frequency band used by the first area entity when the frequencies in the specific frequency band used by the first area entity are congested due to the use by the second area entity. Specifically, when the congestion degree of the frequencies used by the first area entity is not less than a predetermined degree, the user terminal notifies the first area entity of a frequency band change request. The first area entity changes the frequency band used by the first area entity in response to the frequency band change request.

In the first option, the user terminal scans the congestion situation in the specific frequency band and notifies the first area entity of the frequency band change request including the scan result. It should be noted that the scan result includes information indicating a frequency band in which congestion degree is less than the predetermined degree from the viewpoint of the user terminal. The first area entity changes the frequency band used by the first area entity based on the scan result. Specifically, the first area entity changes the frequency band used by the first area entity to the frequency band in which congestion degree is less than the predetermined degree.

In the second option, the first area entity scans the congestion situation in the specific frequency band in response to the frequency band change request. It should be noted that the scan result includes information indicating a frequency band in which congestion degree is less than the predetermined degree from the viewpoint of the first area entity. The first area entity changes the frequency band used by the first area entity based on the scan result. Specifically, the first area entity changes the frequency band used by the first area entity to the frequency band in which congestion degree is less than the predetermined degree.

In the third option, the user terminal scans the congestion situation in the specific frequency band and notifies the first area entity of the frequency band change request including the scan result. It should be noted that the scan result of the user terminal includes information indicating a frequency band in which congestion degree is less than the predetermined degree from the viewpoint of the user terminal. The first area entity scans the congestion situation in the specific frequency band in response to the frequency band change request. It should be noted that the scan result of the first area entity includes information indicating a frequency band in which congestion degree is less than the predetermined degree from the viewpoint of the first area entity. The first area entity changes the frequency band used by the first area entity based on the scan result of the user terminal and the scan result of the first area entity. For example, the first area entity changes the frequency band used by the first area entity to the frequency band in which congestion degree is less than the predetermined degree in the scan results of the user terminal and the first area entity.

In the first to third options described above, preferably, the first area entity changes the frequency band used by the first area entity after the elapse of a certain period of time since the determination of changing the frequency band used by the first area entity. Preferably, the first area entity notifies information indicating the frequency band of the change destination until a certain period of time elapses. The first area entity preferably inquires whether or not to permit the change of the frequency band used by the first area entity of the user terminal connected to the first area entity.

(Radio Communication Method)

Figure 9:
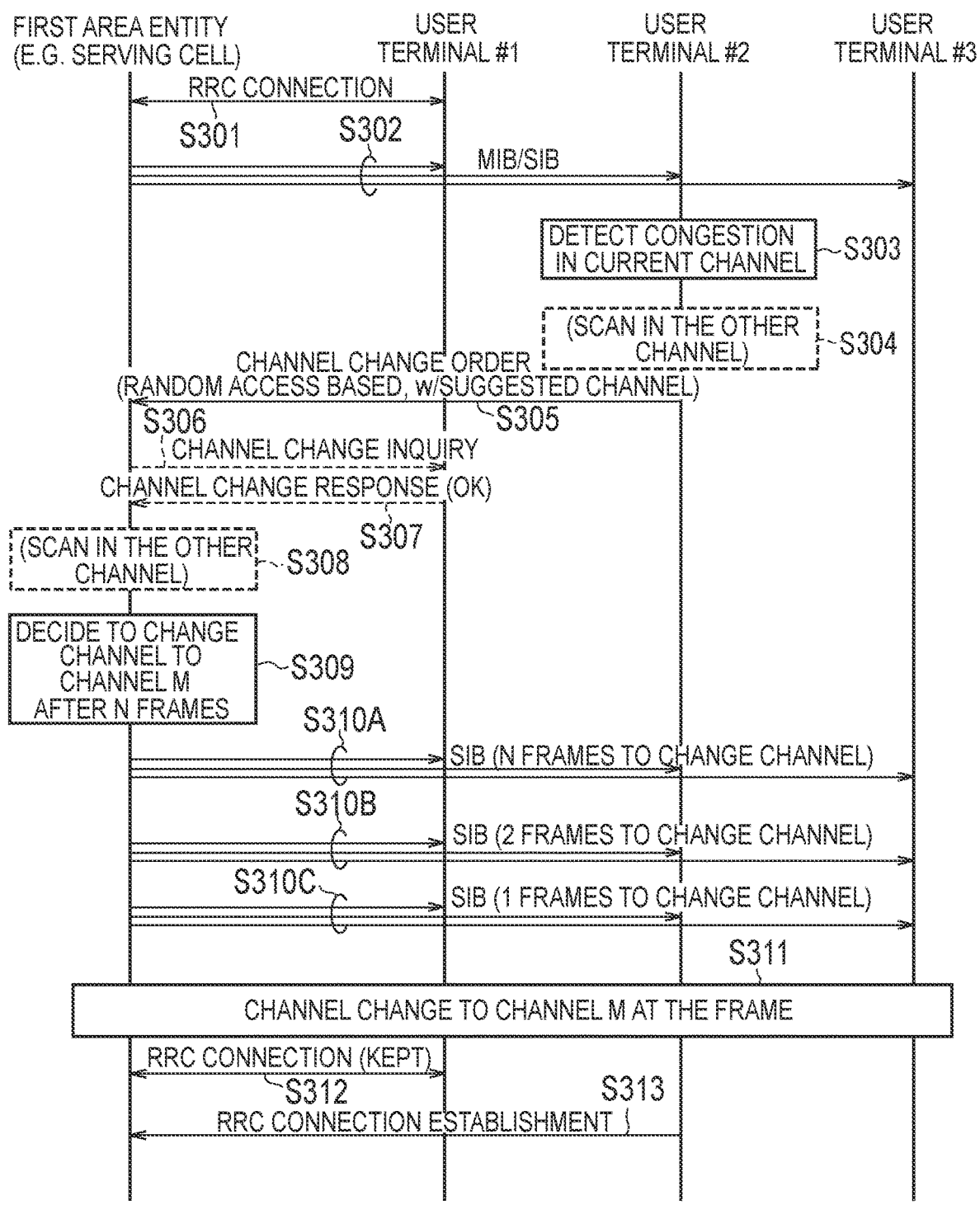
FIG. 9 is a sequence diagram showing a radio communication method according to a first modification.

In the following, a radio communication method according to the first modification will be described. FIG. 9 is a sequence diagram showing a radio communication method according to the first modification. In FIG. 9, the user terminal #1 is connected to the first area entity. The user terminal #2 and the user terminal #3 are not connected to the first area entity, but exist in the area of the first area entity.

As shown in FIG. 9, in step S301, an RRC connection is established between the user terminal #1 and the first area entity.

In step S302, the first area entity notifies a notification signal (for example, MIB or SIB). The notification information is received by the user terminals #1 to #3. It should be noted that the notification information may include information indicating the presence or absence of a candidate for a frequency band of the change destination. In this case, if the notification information includes information indicating that there is a candidate for a frequency band of the change destination, the processing after step S303 may be performed, and if the notification information includes information indicating that there is no candidate for a frequency band of the change destination, the processing after step S303 may be omitted.

In step S303, the user terminal #2 detects that the frequencies in the specific frequency band used by the first area entity are congested due to the use by the second area entity.

In step S304, the user terminal #2 scans the congestion situation in the specific frequency band. However, in the second option described above, step S303 may be omitted.

In step S305, the user terminal #2 notifies the first area entity of a frequency band change request for requesting the change of the frequency band used by the first area entity.

In step S306, the first area entity inquires whether or not to permit the change of the frequency band used by the first area entity of the user terminal #1 connected to the first area entity.

In step S307, the user terminal #1 notifies the first area entity of a frequency band change request for requesting the change of the frequency band used by the first area entity. Here, the description will be continued assuming that the change of the frequency band used by the first area entity is permitted.

In step S308, the first area entity scans the congestion situation in the specific frequency band. However, in the first option described above, step S308 may be omitted.

In step S309, the first area entity decides a change of the frequency band used by the first area entity. Here, the first area entity starts a timer for measuring the elapsed time after deciding the frequency band used by the first area entity.

In steps S310A to S310C, the first area entity notifies information indicating the frequency band of the change destination until a certain period of time elapses. That is, the first area entity notifies the information indicating the frequency band of the change destination until the timer started in step S309 expires. Preferably, the first area entity notifies the information indicating the frequency band of the change destination over a plurality of times in a predetermined cycle. Preferably, this information includes information indicating the timing at which the frequency band used by the first area entity is changed (for example, the number of remaining subframes).

Here, the first area entity may notify information indicating the frequency band of the change destination in the frequency band before change until the timer started in step S309 expires. In this case, preferably, the information indicating the frequency band of the change destination includes information for identifying the frequency band of the change destination. Alternatively, the first area entity may notify information indicating the frequency band of the change destination in the frequency band of the change destination until the timer started in step S309 expires. In this case, the information indicating the frequency band of the change destination may be information indicating that a frequency band in which information indicating the frequency band of the change destination is notified is used, or may be a dummy signal. When the information indicating the frequency band of the change destination is a dummy signal, each user terminal detects that the frequency band of the change destination is used with the dummy signal.

In step S311, the first area entity changes the frequency band used by the first area entity. That is, the first area entity changes the frequency band used by the first area entity in response to the expiration of the timer started in step S309.

In step S312, since the timing at which the frequency band used by the first area entity is changed is notified to the user terminal #1, the RRC connection is maintained between the user terminal #1 and the first area entity.

In step S313, the user terminal #2 establishes an RRC connection with the first area entity.

(Action and Effect)

In the radio communication system according to the first modification, the first area entity changes the frequency band used by the first area entity in response to the frequency band change request. Therefore, interference control in the specific frequency band can be performed by the coordination between different operation schemes. That is, the communication provided by the first operation scheme can be performed while interference in the first operation scheme from the second operation scheme is prevented.

(Second Modification)

In the following, a second modification of the embodiment will be described. In the following, differences from the embodiment will be mainly described.

In the embodiment, the first area entity notifies the second area entity of a resource occupancy request for requesting the occupancy of the resources included in the specific frequency band. On the other hand, in the second modification, the second area entity or the second user terminal existing in the area of the second area entity notifies the first area entity that it is necessary to reserve resources for performing communication between the second area entity and the second user terminal.

Specifically, the second area entity notifies the resource reservation request to be transmitted by using the resource reservation resources in response to the notification of the second user terminal. The first user terminal connected to the first area entity notifies the first area entity that a resource reservation request is detected in response to the detection of the resource reservation request. The first area entity reserves resources for performing communication between the second area entity and the second user terminal in response to the notification of the first user terminal. The resource reservation may mean the reduction in the transmission power of the first area entity, the change of the antenna's directivity of the first area entity, or the suspension of using predetermined resources by the first area entity.

For example, the second area entity notifies the resource reservation request to be transmitted by using the resource reservation resources in response to the notification of the second user terminal or the detection of the downlink signal to be transmitted to the second user terminal. The first user terminal connected to the first area entity notifies the first area entity that a resource reservation request is detected in response to the detection of the resource reservation request. The first area entity reserves resources for performing communication between the second area entity and the second user terminal in response to the notification of the first user terminal. The resource reservation resources mean resources used for the reservation of resources for performing communication between the second area entity and the second user terminal.

In this case, preferably, the first user terminal notifies the second area entity of the synchronization signal indicating the timing of the resource reservation resources. The second area entity synchronizes to transmit the resource reservation request in response to the synchronization signal. Thus, even if the first user terminal connected to the first area entity is asynchronous with the second area entity, the first user terminal can receive a resource reservation request to be notified from the second area entity.

Furthermore, preferably, the second user terminal notifies the second area entity of the trigger information for triggering the transmission of the resource reservation request in the random access procedure for the second area entity. For example, the second user terminal may notify the second area entity of the trigger information by transmitting a random access preamble using specific preamble resources (for example, resource block) or a specific preamble. Here, the specific preamble resources or the specific preamble is resources or a preamble used when the frequency used by the second area entity is congested due to the use by the first area entity. In other words, the specific preamble resources or the specific preamble differs from existing resources or an existing preamble used when the frequency used by the second area entity is not congested. Alternatively, the second user terminal may notify the trigger information to the second area entity by transmitting a scheduled message including the trigger information in response to the random access response received from the second area entity.

In the above exemplification, the second area entity notifies the first area entity, through the first user terminal connected to the first area entity, that the reservation of resources for performing communication between the second area entity and the second user terminal is necessary. However, the second modification is not limited to this. When there is an interface for directly connecting the first area entity and the second area entity, the second area entity may notify the first area entity, without going through the first user terminal, that the reservation of resources for performing communication between the second area entity and the second user terminal is necessary.

In the above examples, the second area entity notifies the first area entity that the reservation of resources for performing communication between the second area entity and the second user terminal is necessary. However, the second modification is not limited to this. The second user terminal may directly notify the first area entity that the reservation of resources for performing communication between the second area entity and the second user terminal is necessary.

(Radio Communication Method)

Figure 10:
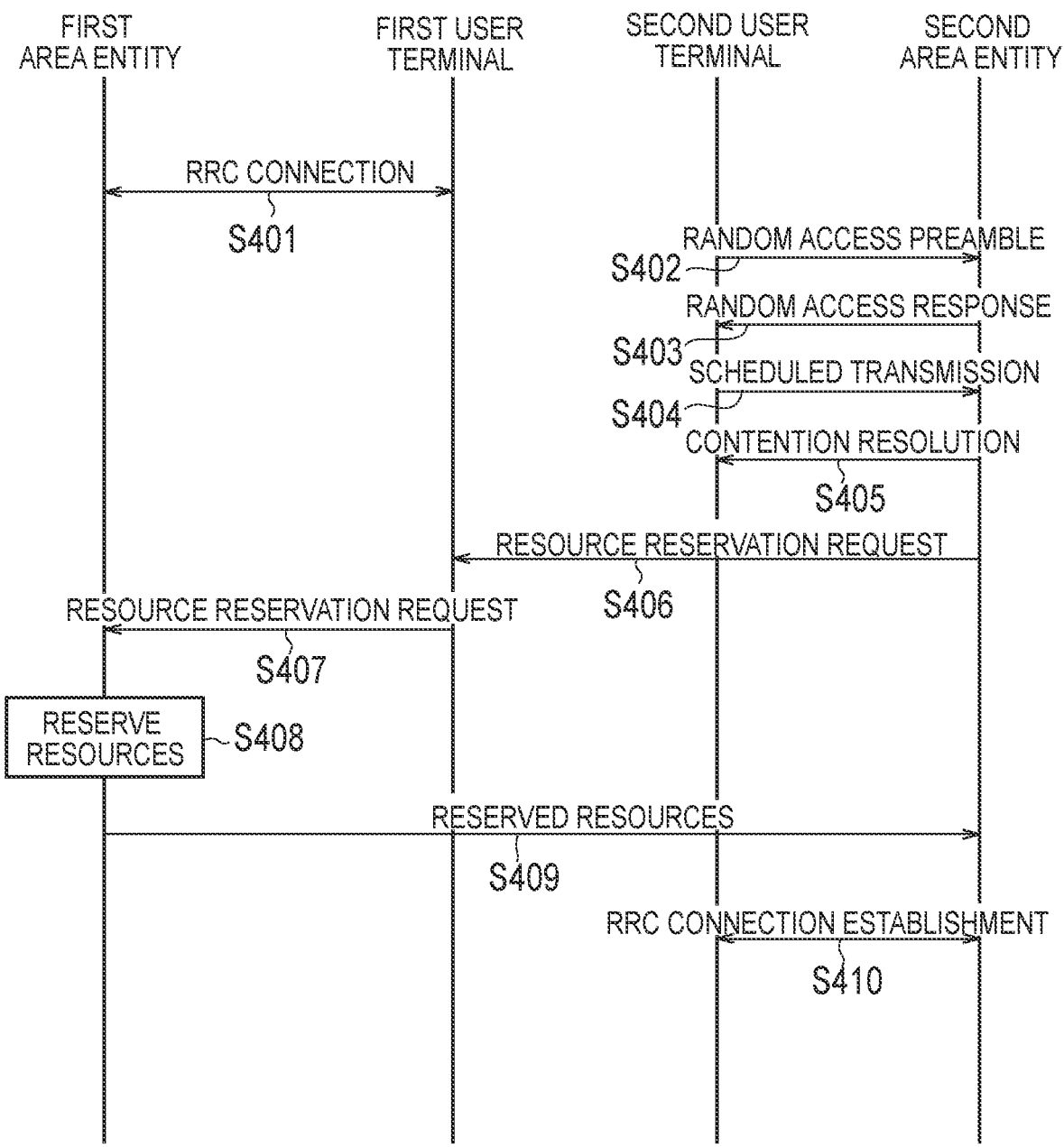
FIG. 10 is a sequence diagram showing a radio communication method according to a second modification.

In the following, a radio communication method according to the second modification will be described. FIG. 10 is a sequence diagram showing a radio communication method according to the second modification. In FIG. 10, the first user terminal is connected to the first area entity. The second user terminal exists in the area of the second area entity. Here, a case where any one of the first area entity and the second area entity is a cell in the mobile communication network will be exemplified.

As shown in FIG. 10, in step S401, an RRC connection is established between the first user terminal and the first area entity.

In step S402, the second user terminal transmits a random access preamble to the second area entity. The second user terminal may transmit a random access preamble by using specific preamble resources or a specific preamble when the frequency used by the second area entity is congested. Thus, the trigger information for triggering the transmission of the resource reservation request is notified to the second area entity.

In step S403, the second area entity transmits a random access response to the second user terminal in response to the random access preamble.

In step S404, the second user terminal transmits a scheduled message including predetermined information (Scheduled Transmission) to the second area entity at the timing determined by the reception timing of the response message (Random Access Response). The second user terminal may notify the trigger information to the second area entity by the transmission of the scheduled message including the trigger information when the frequency used by the second area entity is congested.

In step S405, the second area entity transmits a response message (Contention Resolution) to the scheduled message (Scheduled Transmission) to the second user terminal.

It should be noted that in the case where the second area entity notifies the resource reservation request to be transmitted by using the resource reservation resources in response to the detection of the downlink signal that should be transmitted to the second user terminal, the processing in steps S402 to S405 is omitted.

In step S406, the second area entity notifies the resource reservation request to be transmitted by using the resource reservation resources.

In step S407, the first user terminal notifies the first area entity that the resource reservation request is detected in response to the detection (reception) of the resource reservation request from the second area entity, In step S408, the first area entity reserves resources for performing communication between the second area entity and the second user terminal in response to the notification of the first user terminal.

In step S409, preferably, the first area entity notifies the second area entity that the resources for performing communication between the second area entity and the second user terminal is reserved.

In step S410, the second user terminal establishes an RRC connection with the first area entity.

(Action and Effect)

In the radio communication system according to the second modification, the second area entity or the second user terminal notifies the first area entity that the reservation of resources for performing communication between the second area entity and the second user terminal is necessary. Therefore, interference control in the specific frequency band can be performed by the coordination between different operation schemes. That is, the communication provided by the second operation scheme can be performed while interference in the second operation scheme from the first operation scheme is prevented.

[Third Modification]

In the following, a third modification of the embodiment will be described. In the following, differences from the embodiment will be mainly described.

In the embodiment, the first area entity notifies the second area entity of a resource occupancy request for requesting the occupancy of the resources included in the specific frequency band. On the other hand, in the third modification, the specific frequency band includes connection procedure resources the allocation of which to the data transmission is prohibited, and the user terminal existing in the area of the first area entity performs a connection procedure for the first area entity by using connection procedure resources.

For example, when the first area entity is a cell of the mobile communication network and the bandwidth used by the first area entity is 20 MHz, six resource blocks provided at the center of the bandwidth used by the first area entity may be used as the connection procedure resources. The connection procedure resources are prohibited from allocating PDSCHs, and information such as synchronization signals (PSS and SSS), reference signals (CRS), notification signals (MIB and SIB) is transmitted by using the connection procedure resources.

It should be noted that in order to prevent the frequency direction deviation of the connection procedure resources, the unit of the frequency band used for communication (channel) is preferably defined also in WiFi similarly to the mobile communication network.

[Other Embodiments]

Although the present application is described by using the above-described embodiments, it should not be understood that the description and drawings constituting a part of this disclosure limit the present application. From this disclosure, various alternative embodiments, examples, and operation techniques will be apparent to those skilled in the art.

Similarly to the connection procedure resources according to the third modification, the resource reservation resources used for the transmission of the resource reservation request according to the second modification may be the resources in which allocation to data transmission is prohibited. The resource reservation resources may be the same resources as the connection procedure resources.

Although not specifically mentioned in the embodiment, a program for causing a computer to execute each processing performed by the UE 100 and the eNB 200 may be provided. In addition, the program may be recorded on a computer readable medium. Using the computer readable medium allows the program to be installed on the computer. Here, the computer readable medium on which the program is recorded may be a non-transitory recording medium. The non-transitory recording medium is not particularly limited, but may be a recording medium such as CD-ROM and DVD-ROM, for example.

Alternatively, a chip including a memory for storing a program for executing each piece of processing performed by the UE 100 and the eNB 200 and a processor for executing a program stored in the memory may be provided.

In the embodiment, an LTE system is described as an example of a mobile communication system. However, the embodiment is not limited to this. The mobile communication system may be a system other than the LTE system.

INDUSTRIAL APPLICABILITY

The present application is useful in the communications field.

The invention claimed is:

1. A radio communication system comprising:
   a first radio communication apparatus operated in a first operation scheme in which use of a specific frequency band is permitted; and
   a second radio communication apparatus operated in a second operation scheme in which use of the specific frequency band is permitted, wherein
   a user terminal existing in an area of the first radio communication apparatus notifies the first radio communication apparatus of a frequency band change request for requesting a change of a frequency band used by the first radio communication apparatus when a frequency of the specific frequency band used by the first radio communication apparatus is congested due to use by the second radio communication apparatus,
   the first radio communication apparatus changes the frequency band used by the first radio communication apparatus in response to the frequency band change request, and
   the first radio communication apparatus scans a congestion situation in the specific frequency band in response to the frequency band change request and changes the frequency band used by the first radio communication apparatus based on a scan result of the first radio communication apparatus.

2. The radio communication system according to claim 1, wherein the user terminal scans the congestion situation in the specific frequency band to notify the first radio communication apparatus of the frequency band change request including a scan result,
   the first radio communication apparatus changes the frequency band used by the first radio communication apparatus based on the scan result of the user terminal and the scan result of the first radio communication apparatus.

3. The radio communication system according to claim 1, wherein after a certain time elapses since deciding the change of the frequency band used by the first radio communication apparatus, the first radio communication apparatus changes the frequency band used by the first radio communication apparatus.

4. The radio communication system according to claim 3, wherein
   the first radio communication apparatus notifies information indicating a frequency band of a change destination until the certain time elapses.

5. The radio communication system according to claim 1, wherein the first radio communication apparatus inquires whether or not to permit the change of the frequency band used by the first radio communication apparatus of the user terminal connected to the first radio communication apparatus.

6. A user terminal existing in an area of a first radio communication apparatus operated in a first operation scheme in which use of a specific frequency band is permitted, the user terminal comprising:
   a processor and a memory coupled to the processor, wherein
   the processor is configured to notify the first radio communication apparatus of a frequency band change request for requesting a change of a frequency band used by the first radio communication apparatus when a frequency of the specific frequency band used by the first radio communication apparatus is congested due to use by a second radio communication apparatus operated in a second operation scheme in which use of the specific frequency band is permitted, and the first radio communication apparatus scans a congestion situation in the specific frequency band in response to the frequency band change request and changes the frequency band used by the first radio communication apparatus to communicate with the user terminal, based on a scan result of the first radio communication apparatus.

7. A radio communication method used in a radio communication system including a first radio communication apparatus operated in a first operation scheme in which use of a specific frequency band is permitted; and a second radio communication apparatus operated in a second operation scheme in which use of the specific frequency band is permitted, the radio communication method comprising:

notifying by a user terminal existing in an area of the first radio communication apparatus, the first radio communication apparatus of a frequency band change request for requesting a change of a frequency band used by the first radio communication apparatus when a frequency of the specific frequency band used by the first radio communication apparatus is congested due to use by the second radio communication apparatus; and changing by the first radio communication apparatus, the frequency band used by the first radio communication apparatus in response to the frequency band change request, wherein the changing comprises:

scanning by the first radio communication apparatus, a congestion situation in the specific frequency band in response to the frequency band change request; and changing the frequency band used by the first radio communication apparatus based on a scan result of the first radio communication apparatus.

\* \* \* \* \*